(12) United States Patent
Perez-Ramirez et al.

(10) Patent No.: US 10,586,394 B2
(45) Date of Patent: Mar. 10, 2020

(54) AUGMENTED REALITY DEPTH SENSING USING DUAL CAMERA RECEIVER

(71) Applicant: INTEL CORPORATION, Santa Clara, CA (US)

(72) Inventors: Javier Perez-Ramirez, North Plains, OR (US); Spencer Markowitz, Harrisburg, PA (US); Zoran Zivkovic, Hertogenbosch (NL)

(73) Assignee: Intel Corporation, Santa Clara, CA (US)

( * ) Notice: Subject to any disclaimer, the term of this patent is extended or adjusted under 35 U.S.C. 154(b) by 70 days.

(21) Appl. No.: 15/909,759

(22) Filed: Mar. 1, 2018

(65) Prior Publication Data

US 2019/0043261 A1 Feb. 7, 2019

(51) Int. Cl.
*G06T 19/00* (2011.01)
*G01S 17/10* (2020.01)
(Continued)

(52) U.S. Cl.
CPC .............. *G06T 19/006* (2013.01); *G01S 5/16* (2013.01); *G01S 11/12* (2013.01); *G01S 17/10* (2013.01); *G02B 27/017* (2013.01); *G06F 3/011* (2013.01); *G06F 3/147* (2013.01); *G06K 9/00671* (2013.01); *G06K 9/6202* (2013.01); *G06T 7/593* (2017.01); *G06T 15/20* (2013.01);
(Continued)

(58) Field of Classification Search
CPC .................................................. G06T 19/006
See application file for complete search history.

(56) References Cited

U.S. PATENT DOCUMENTS

2014/0093249 A1* 4/2014 Roberts ................ G01C 21/165
398/127
2014/0225916 A1* 8/2014 Theimer ............... G06T 19/006
345/633
(Continued)

OTHER PUBLICATIONS

Loop et al, "Computing Rectifying Homographies for Stereo Vision," 1999 IEEE Computer Society Conference on Computer Vision and Pattern Recognition, USA, 1999, 7 pages.
(Continued)

*Primary Examiner* — Phi Hoang
(74) *Attorney, Agent, or Firm* — International IP Law Group, P.L.L.C.

(57) ABSTRACT

An example apparatus for depth sensing includes an image data receiver to receive image data from a communication camera and an augmented reality (AR) camera. The apparatus also includes a modulated light detector to detect one or more modulated lights in the image data from the communication camera. The apparatus further includes a representation generator to generate a visual representation of a local image region for each of the detected modulated lights. The apparatus includes a region matcher to match the visual representation for each of the detected modulated lights with a region in the image data received from the AR camera. The apparatus also further includes a distance estimator to estimate a distance between a dual camera receiver and the one or more modulated lights based on a disparity between a position of the visual representation and a position of the matched region in the image data.

22 Claims, 8 Drawing Sheets

(51) Int. Cl.
*G06T 15/20* (2011.01)
*G06F 3/01* (2006.01)
*G06K 9/62* (2006.01)
*G02B 27/01* (2006.01)
*G06T 7/593* (2017.01)
*G01S 11/12* (2006.01)
*G01S 5/16* (2006.01)
*G06K 9/00* (2006.01)
*G06F 3/147* (2006.01)
*G06F 3/14* (2006.01)

(52) U.S. Cl.
CPC ...... *G06F 3/14* (2013.01); *G06T 2207/30204* (2013.01); *G09G 2340/12* (2013.01)

(56) References Cited

U.S. PATENT DOCUMENTS

| | | | | |
|---|---|---|---|---|
| 2015/0002734 | A1* | 1/2015 | Lee | H04N 5/2256 348/367 |
| 2016/0050407 | A1* | 2/2016 | Chen | H04N 5/23212 348/47 |
| 2017/0374256 | A1* | 12/2017 | Wagner | H04N 5/23251 |
| 2018/0205926 | A1* | 7/2018 | Mogalapalli | G06T 7/521 |

OTHER PUBLICATIONS

Ma et al., "A Modified Census Transform Based on the Neighborhood Information for Stereo Matching Algorithm," 2013 Seventh International Conference on Image and Graphics, China, 2013, pp. 533-538.

* cited by examiner

200

AUGMENTED REALITY DEPTH SENSING USING DUAL CAMERA RECEIVER

BACKGROUND

Camera Communications (CamCom) is the transmission of data using modulated lights acting as transmitters and a digital camera acting as a receiver. CamCom systems use custom waveforms to modulate light sources and provide flicker free communications. In some examples, CamCom systems can provide bit rates ranging from 15 bits per second (bps) to 20,000 bps in broadcasting links.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
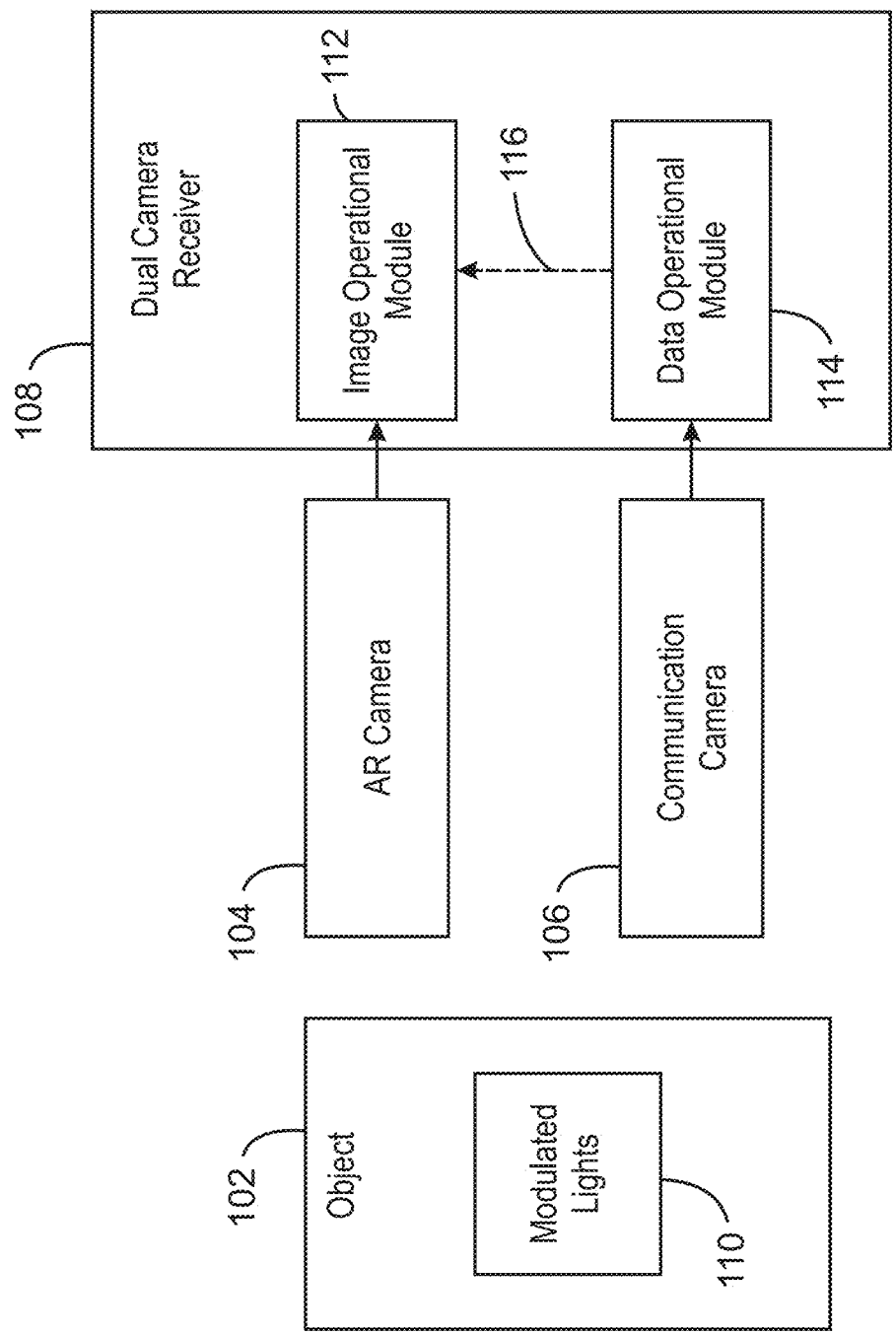
FIG. 1 is a block diagram illustrating an example augmented reality system that can detect depth using a dual camera receiver.

As discussed above, Camera Communications (CamCom) is the transmission of data using modulated lights acting as transmitters and a digital camera acting as a receiver. For example, extraction of data from modulated lights may be performed using one camera with different camera operational modes, including low exposure time and/or region of interest (ROI) modes during which the camera is solely used for communication purposes. An augmented reality (AR) module can then use the extracted information associated to each modulated light to enhance the provided experience. Thus, the modulated lights may be used as beacons. However, in a single camera CamCom setup, the camera can either provide visual images and slow communications or fast communications, but not visual images. In addition, no depth information of the modulated lights can be extracted using the single camera approach.

Moreover, extraction of data from the modulated lights may involve different camera operational modes, including low exposure time and/or ROI modes during which the camera is solely used for communication purposes. For example, in AR applications this processing can involve latencies of several seconds before any data is ingested and presented to the user. In some examples, a single camera may operate at a standard frame rate with automatic exposure time control while providing the AR experience to the user. However, in order to find and extract data from modulated lights, the AR experience may be halted so that the camera can change to communication operational mode with a fast exposure time and process the incoming video stream. This communication operational mode may be used to find, track and extract data from modulated lights and produce a set of images not usable for AR applications. Depending on the camera technical specifications, changing to this mode can take up to several seconds severely affecting the AR user experience.

The present disclosure relates generally to techniques for detecting depth in an augmented reality system. Specifically, the techniques described herein include a system, method and a computer readable medium for detecting depth in an augmented reality system using a dual camera receiver. An example system includes an image data receiver to receive image data from a communication camera and an augmented reality (AR) camera. The system includes a modulated light detector to detect one or more modulated lights in the image data from the communication camera. The system further includes a representation generator to generate a visual representation of a local image region for each of the detected modulated lights. The system also includes a region matcher to match the visual representation for each of the detected modulated lights with a region in the image data received from the AR camera. The system further includes a distance estimator to estimate a distance between a dual camera receiver and the one or more modulated lights based on a disparity between a position of the visual representation and a position of the matched region in the image data. In some examples, the system also further includes an AR visualization modifier to modify an AR visualization based on the estimated distance.

The techniques described herein thus enable depth information as well as transmitted data from the modulated light sources to be obtained simultaneously. Thus, the techniques described herein may provide a better Augmented Reality experience using modulated light sources. For example, the techniques described herein may be used to provide different AR visualizations based on the distance that an AR headset is from the objects including modulated light sources. In addition, the techniques described herein may allow many other applications that rely on detection of three dimensional (3D) location of objects relative to one or more camera devices.

FIG. 1 is a block diagram illustrating an example augmented reality system that can detect depth using a dual camera receiver. The example system is referred to generally by the reference number 100 and can be implemented in the computing device 600 below in FIG. 6 using the method 500 of FIG. 5 below.

The example system 100 includes an object 102. The system 102 also includes an augmented reality (AR) camera 104 and a communication camera 106, both communicatively coupled to a dual camera receiver 108. The object 102 includes one or more modulated lights 110. For example, the modulated lights 110 may be light-emitting diodes (LEDs). The dual camera receiver 108 further includes an image operational module 112 and a data operational module 114 that is communicatively connected to the image operational module 112 as shown by an arrow 116.

As shown in FIG. 1, the AR camera 104 may take color image capture of a scene including the object 102 for display on an AR headset (not shown). For example, the AR camera 104 may operate in an image operational mode with the image operational module 112 to capture a video stream at full resolution at a rate of 24 or 30 frames per second (fps). In some examples, the exposure time of the AR camera 104 may be an automatic exposure time that is based on a detected level of ambient light. For example, the automatic exposure time may be lower with large levels of ambient light and higher with lower levels of ambient light. The communication camera 106, which may be part of a camera communication (CamCom) system, may use custom waveforms to modulate light sources and provide flicker free communication. For example, the communication may be between one or more of the modulated lights 110 of the object 102 and the communication camera 106. In some examples, the communication camera 106 may operate in a data operational mode with the data operational module 114 at a high frame rate. For example, the communication camera 106 may operate at a rate of 240 frames per second (fps) or higher. Thus, the communication camera 106 may not take fully exposed photos due to the limited light captured in the fast exposure time. The AR camera 104 and the communication camera 106 and may be set up in a stereo vision configuration. For example, there may be a preconfigured known distance between the AR camera 104 and the communication camera 106. In some examples, the AR camera 104 and the communication camera 106 may be located along the same horizontal axis.

In some examples, the data operational module 114 can generate depth data 116 based on one or more captured frames and send the depth data to the image operational module 112 as shown by the arrow 116. For example, the communication camera 106 can be used by the data operational module 114 to first detect and track the modulated lights 110. At this stage, the data operational module 114 can extract data from each modulated light. In some examples, each modulated light may be defined by the location of the modulated light in the sensor plane and the data associated with each modulated light. For example, the location of a modulated light source can be defined by the coordinates of the pixel located at the center of the detected modulated light.

Once data is extracted from each modulated light, the data operational module 114 can then generate a visual representation of a local image region for each detected modulated light. For example, the visual representation may be a representation suitable for matching with another camera, which may be working in an augmented reality (AR)/Visual mode. In some examples, generation of visual representations can be performed during extraction of the data in a parallel process. For example, the visual representation may be a small pixel patch using a census transformation of the local image region. One example visual representation generated using a census transformation is shown and described with respect to FIG. 2 below. In some examples, because the communication camera 106 operates at high frame rate, a temporal averaging can be used to build the visual representation as similar as possible to its counterpart in the AR camera 104, which may operate at, for example, a much lower frame rate of 30 fps. Alternatively, in some examples, both of the AR and the COM camera image patches can be transformed to visual representations for matching to image regions. In some examples, the transformation of local image regions into visual representations can be performed using neural networks. For example, the neural network parameters can be trained such that the accuracy of matching the patches between the two cameras is maximized. In some examples, the neural network can be trained using a set of random non matching patches. The neural network can be trained to predict values that, for example, that may result in higher values for matching patches.

After generating one or more visual representations, the data operational module 114 can then send the position and the visual representation of each modulated light to the AR camera 104. For example, the position of each modulated light may be represented in a (x, y) pair format.

In some examples, the AR camera 104, which may be at a known predetermined stereo setup position, can search for the visually similar point along the epipolar line corresponding to the (x, y) position from the communication camera 106. Thus, the image operational module 112 connected to the AR camera 104 can generate new (x', y') coordinates of the estimated LED light location in the AR camera image plane. In some examples, the image operational module 112 can use these new (x', y') coordinates, along with the coordinates (x, y) and the known distance between the stereo cameras 104 and 106, to perform an estimation of the distance between the dual camera receiver 108 and the modulated lights 110. For example, the distance z between the dual camera receiver 108 and the modulated lights 110 can be obtained using the equation:

$$z = f*b/d \qquad \text{Eq. 1}$$

where z is the distance from a cameras to the object, d is the disparity in pixel locations, b is the distance between the two cameras, and f is the focal length of the cameras. In some examples, various AR features may be provided based on the calculated distance z. For example, a visualization of an AR headset may be modified based on the distance z. As one example, different overlays may be displayed next to objects including modulated lights based on the information received from the modulated lights and the distance z. In some examples, a three dimensional (3D) relative position can also be calculated based on the (x, y) image coordinate and the distance z.

In some examples, the data operational module 114 can use an under-sampled orthogonal frequency shift on-off keying (UFSOOK) modulation for communication by the communication camera 106. For example, such waveform may be especially tailored for a communication camera 106 such as a camera running at standard frame rates to provide typically low data rate communications. As one example, a camera 106 may have a standard frame rate of 24 or 30 frames per second (fps) with a communication data rate of 15 bps. UFSOOK may thus operate with video streams captured at standard camera frame rates. In some examples, the data operational module 114 with UFSOOK modulation may include a frame grabber receiving a video stream from the communication camera 106. For example, the frame grabber may operate at a fast exposure rate and full resolution. A modulated light detector can then detect one or more modulated lights in the frames of the captured video stream. A payload extractor may then extract data from the one or more detect modulated lights. In some examples, the frame grabber, the modulated light detector, and the payload extractor may be included in the data operational module 114 associated with the communication camera 106.

In some examples, to achieve higher data rates, the data operational module 114 can alternatively, or additionally, use a Composite Waveform modulation. For example, the Composite Waveform may be designed to operate with a communication camera 106 with region of interest (ROI)

capabilities. In some examples, when using the Composite Waveform, the AR camera 104 can operate in a standard frame rate and slow exposure mode to find modulated lights 110. For example, the AR camera 104 may operate at a frame rate of 24 or 30 fps. The data operational module 114 can process pixel subsets corresponding to detected modulated lights using a camera ROI mode of the communication camera 106. The ROI mode allows the communication camera 106 to use a fast exposure mode and higher frame rate per ROI. For example, the frame rate may be up to 1,000 frames per second (fps) or more. The data operational module 114 can then detect modulated lights 110 from the video stream and this communication data is directly extracted from the video stream. By using a Composite Waveform, data rates of up to 5,000 bps may be achieved.

In some examples, regardless of which one of the selected waveforms described above is used, the communication camera 106 and data operational module 114 may allow for easy association between the modulated source and the transmitted data in the physical (PHY) layer. In some examples, both UFSOOK and the Composite Waveform implementations may have built in mechanisms to allow the detection of modulated lights 110 at the dual camera receiver 108.

As described in greater detail below, in some examples, the video captured by cameras 104 and 106 may also be used to detect a distance between the dual camera receiver 108 and the modulated lights 110. This can be used to enable applications that are based on the distance between the dual camera receiver 108 and the modulated lights 110. For example, an AR overlay in an AR visualization can be modified in size.

The diagram of FIG. 1 is not intended to indicate that the example system 100 is to include all of the components shown in FIG. 1. Rather, the example system 100 can be implemented using fewer or additional components not illustrated in FIG. 1 (e.g., additional cameras, receivers, objects, modulated lights, modules, etc.).

Figure 2:
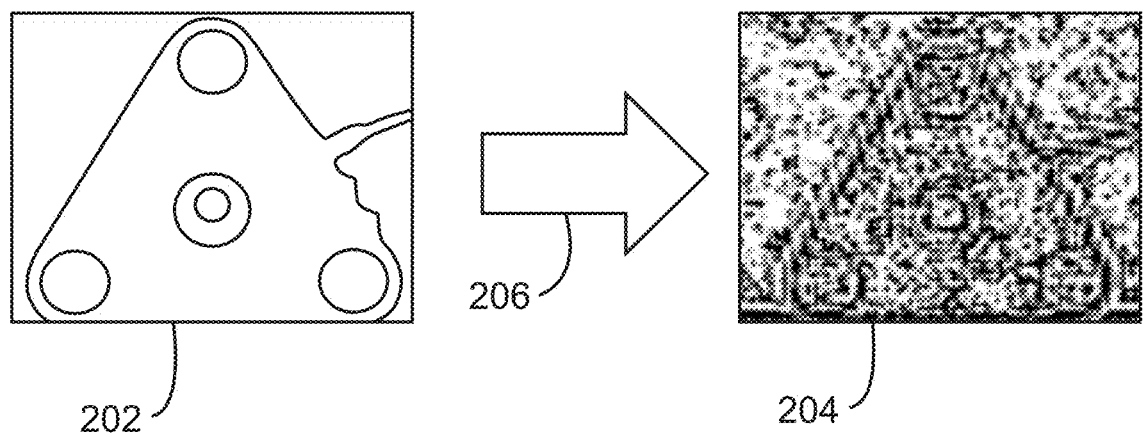
FIG. 2 is a diagram illustrating an example local binary pattern of an example LED tag.

FIG. 2 is a diagram illustrating an example local binary pattern of an example LED tag. The example local binary pattern is generally referred to by the reference number 200 and can be implemented in the computing device 600 below. For example, the local binary pattern 200 can be generated using the data operational module 114 of the dual camera receiver 108 of the system 100 of FIG. 1 above, the representation generator 636 of the computing device 600 of FIG. 6 below, or the processor 702 and representation generator module 710 of the computer readable media 700 of FIG. 7 below.

FIG. 2 shows an example captured image 202 of a modulated light in the form of an LED tag and a corresponding resulting pixel patch 204 obtained using a local binary pattern 206. For example, the local binary pattern may be a census transform. In some examples, different size ROIs may be used to obtain the estimated coordinates (x', y'). In one example, two cameras were placed 6.42 centimeters (cm) from each other in a stereo camera set up, with both cameras using a resolution of 4032×3024 pixels. An ROI was defined around a center (x, y) of the modulated light in the camera image plane of the communication camera and a generated visual representation used find the location of the tag in the AR camera across the epipolar line corresponding to (x, y). As shown and discussed in greater detail below with respect to FIGS. 3A-3C, when computing the Hamming correlation across the epipolar line, a good estimate of the LED tag location (3 pixel error) can be obtained when using medium size ROIs shown in FIG. 3B.

Furthermore, using the known distance between the two cameras, focal length, pixel size, and disparity between the two objects in the image plane, the distance from the stereo system to the object was calculated. For example, using Eq. 1 above, the distance of 3.48 meters calculated using medium regions of interest resulted in an error of only 13% as compared to the actual distance.

The diagram of FIG. 2 is not intended to indicate that the example local binary pattern 200 is to include all of the components shown in FIG. 2. Rather, the example local binary pattern 200 can be implemented using fewer or additional components not illustrated in FIG. 2 (e.g., additional types of modulated lights, transformations, etc.).

Figure 3B:
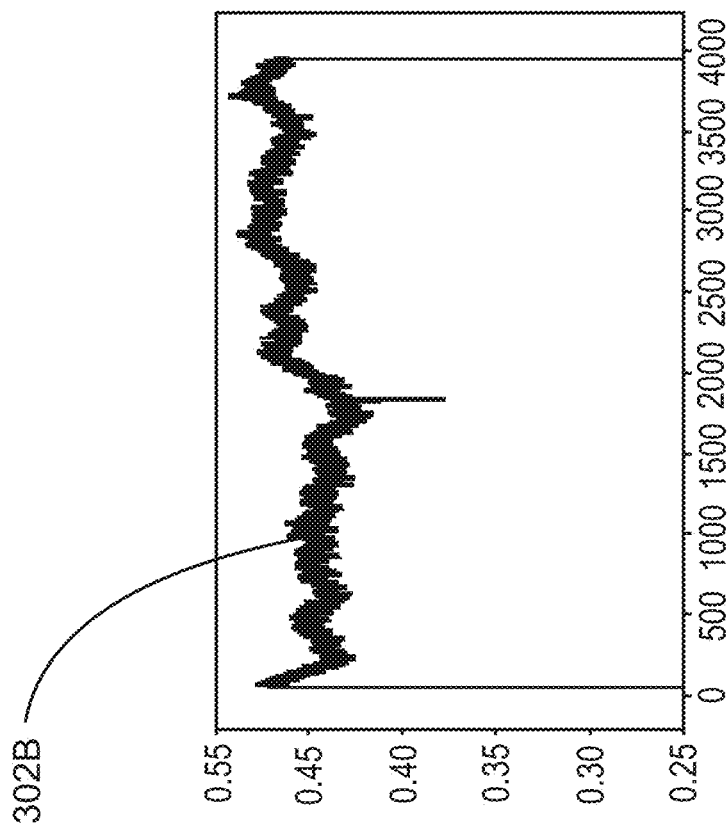
FIG. 3B is a graph illustrating a hamming correlation of predicted pixel location using an example medium region of interest.
Figure 3A:
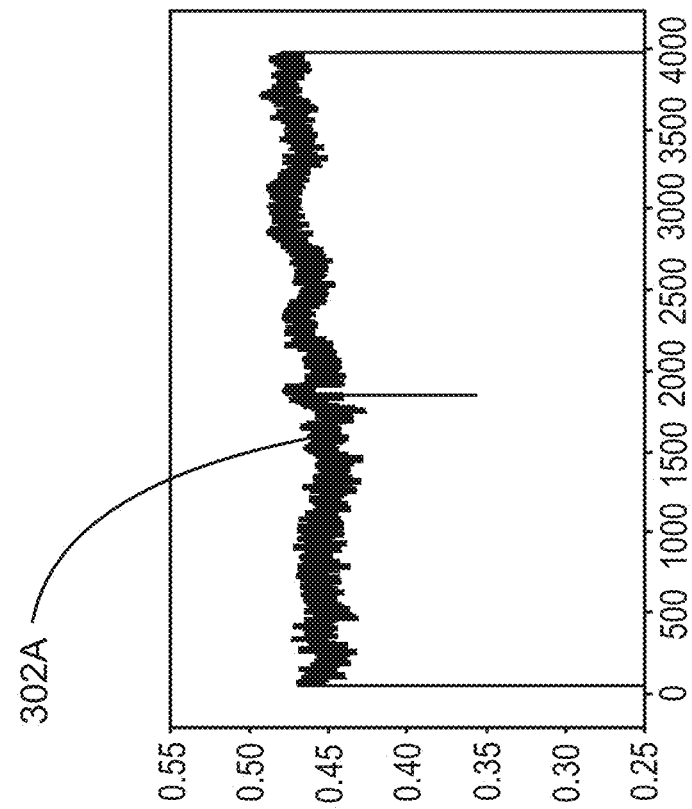
FIG. 3A is a graph illustrating a hamming correlation of predicted pixel location using an example small region of interest.

FIG. 3A is a graph illustrating a hamming correlation of predicted pixel location using an example small region of interest. The graph is generally referred to by the reference number 300A and the small region of interest can be implemented in the computing device 600 below. For example, the small region of interest can be used in calculating predicted pixel locations in the data operational module 114 of the dual camera receiver 108 of FIG. 1, the representation generator 636 of the computing device 600 of FIG. 6 below, or the processor 702 of the computer readable media 700 of FIG. 7 below.

FIG. 3A shows a range of hamming correlation values 302A for a domain of pixel values limited to an epipolar line corresponding to a communication camera detected modulated light center with a small ROI size of 95×112 pixels. As shown in FIG. 3A, a predicted pixel location was located at the value 1851, indicated by the spike in the graph 300A. The distance of the modulate light from the dual camera receiver was 4 meters and the actual pixel location was 1852. As seen in FIG. 3A, the correlation values are generally below 0.50 for all pixel locations.

FIG. 3B is a graph illustrating a hamming correlation of predicted pixel location using an example medium region of interest. The graph is generally referred to by the reference number 300B and the medium region of interest can be implemented in the computing device 600 below. For example, the small region of interest can be used in calculating predicted pixel locations in the data operational module 114 of the dual camera receiver 108 of FIG. 1, the representation generator 636 of the computing device 600 of FIG. 6 below, or the processor 702 of the computer readable media 700 of FIG. 7 below.

FIG. 3B shows a range of hamming correlation values 302B for a domain of pixel values limited to an epipolar line corresponding to a communication camera detected modulated light center with a medium ROI size of 140×132 pixels. As shown in FIG. 3B, a predicted pixel location was located at the value 1851, indicated by the spike in the graph 300B. The distance of the modulate light from the dual camera receiver was 4 meters and the actual pixel location was 1852. As seen in FIG. 3B, the correlation values are generally closer to 0.55 for most of the pixel locations, as compared to FIG. 3A for the smaller ROI.

Figure 3C:
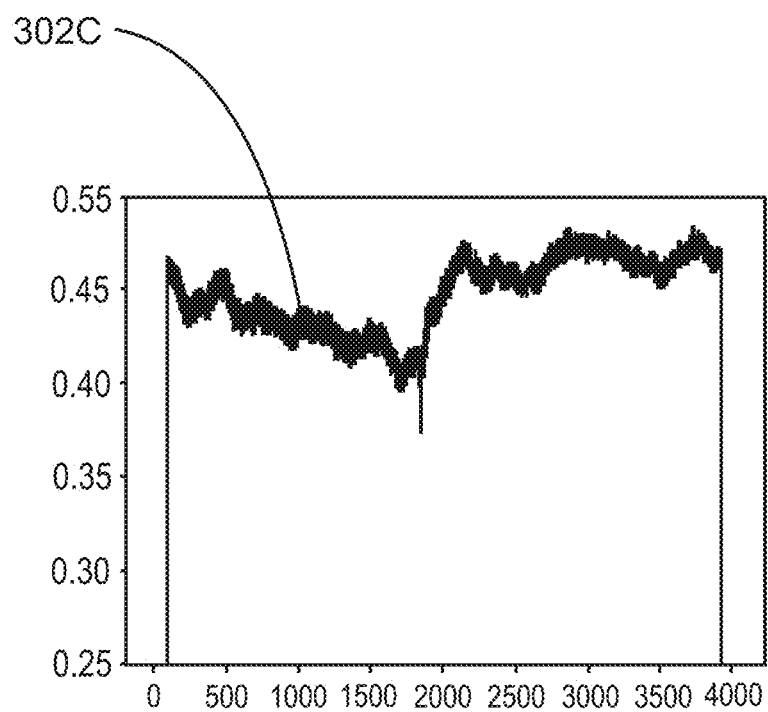
FIG. 3C is a graph illustrating a hamming correlation of predicted pixel location using an example large region of interest.

FIG. 3C is a graph illustrating a hamming correlation of predicted pixel location using an example large region of interest. The graph is generally referred to by the reference number 300C and the large region of interest can be implemented in the computing device 600 below. For example, the small region of interest can be used in calculating predicted pixel locations in the data operational module 114 of the dual camera receiver 108 of FIG. 1, the representation generator 636 of the computing device 600 of FIG. 6 below, or the processor 702 of the computer readable media 700 of FIG. 7 below.

FIG. 3C shows a range of hamming correlation values 302C for a domain of pixel values limited to an epipolar line corresponding to a communication camera detected modulated light center with a large ROI size of 160×192 pixels. As shown in FIG. 3C, a predicted pixel location was located at the value 1851, indicated by the spike in the graph 300C. The distance of the modulate light from the dual camera receiver was 4 meters and the actual pixel location was 1849. As seen in FIG. 3A, the correlation values are generally below 0.50 for all pixel locations before the spike, but higher than 0.50 for pixel locations after the spike.

Figure 4:
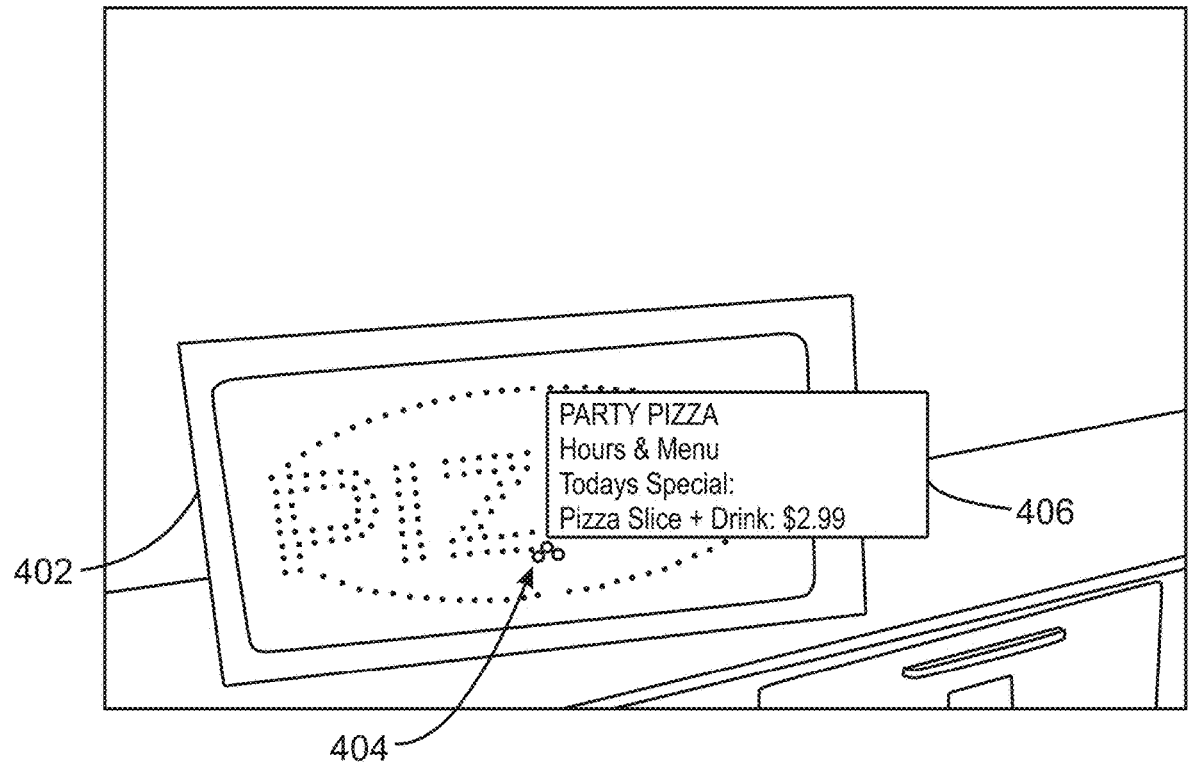
FIG. 4 is a diagram illustrating an example augmented reality display of a sign including an LED tag.

FIG. 4 is a diagram illustrating an example augmented reality (AR) display of a sign including an LED tag. The example AR display is generally referred to by the reference number 400 and can be implemented in the computing device 600 below. For example, the AR display 400 can be generated using the AR visualization modifier 642 of the AR Depth-sensing visualizer 630 of the computing device 600 FIG. 6 below or the AR visualization modifier module 716 of the computer readable media 700 of FIG. 7 below. The example AR display can be displayed in the AR headset 619 of FIG. 6 below.

As shown in FIG. 4, an example augmented reality (AR) display 400 can include an object 402, such as a sign, including modulated lights 404, and a generated overlay 406. For example, the overlay 406 may be generated by the AR visualization modifier 642.

FIG. 4 shows an example AR experience integrating information extracted from a modulated light source and depth sensing. In this example, an estimated distance between the camera and the modulated light source can be used to increase the size or augment a message shown to the user. For example, in response to detecting the modulated lights 404 at a far distance from the camera, the overlay 406 of the AR display 400 may only show "Party Pizza" to the user. However, as this distance decreases, more information may be shown to the user. For example, such information may include hours of operation, a menu, special offers, etc. In addition, when multiple modulated lights 404 are included in the display 400, then an accurate 2D or 3D positioning can be obtained. In some examples, given a distance to three points in space that have a known 3D world position, then a camera 3D world position can be calculated. For example, the three points in space may be modulated lights put on specific points in space. In some examples, triangulation may be used to calculate a camera 3D world position. In some examples, the camera 3D world position may also be calculated using two points in space under certain constraints. For example, if the camera system is on a known plane then the known plane can be used as a constraint. As one example, a robot may be operating on a plane corresponding to a floor.

The diagram of FIG. 4 is not intended to indicate that the example AR display 400 is to include all of the components shown in FIG. 4. Rather, the example AR display 400 can be implemented using fewer or additional components not illustrated in FIG. 4 (e.g., additional overlays, modulated lights, objects, etc.).

Figure 5:
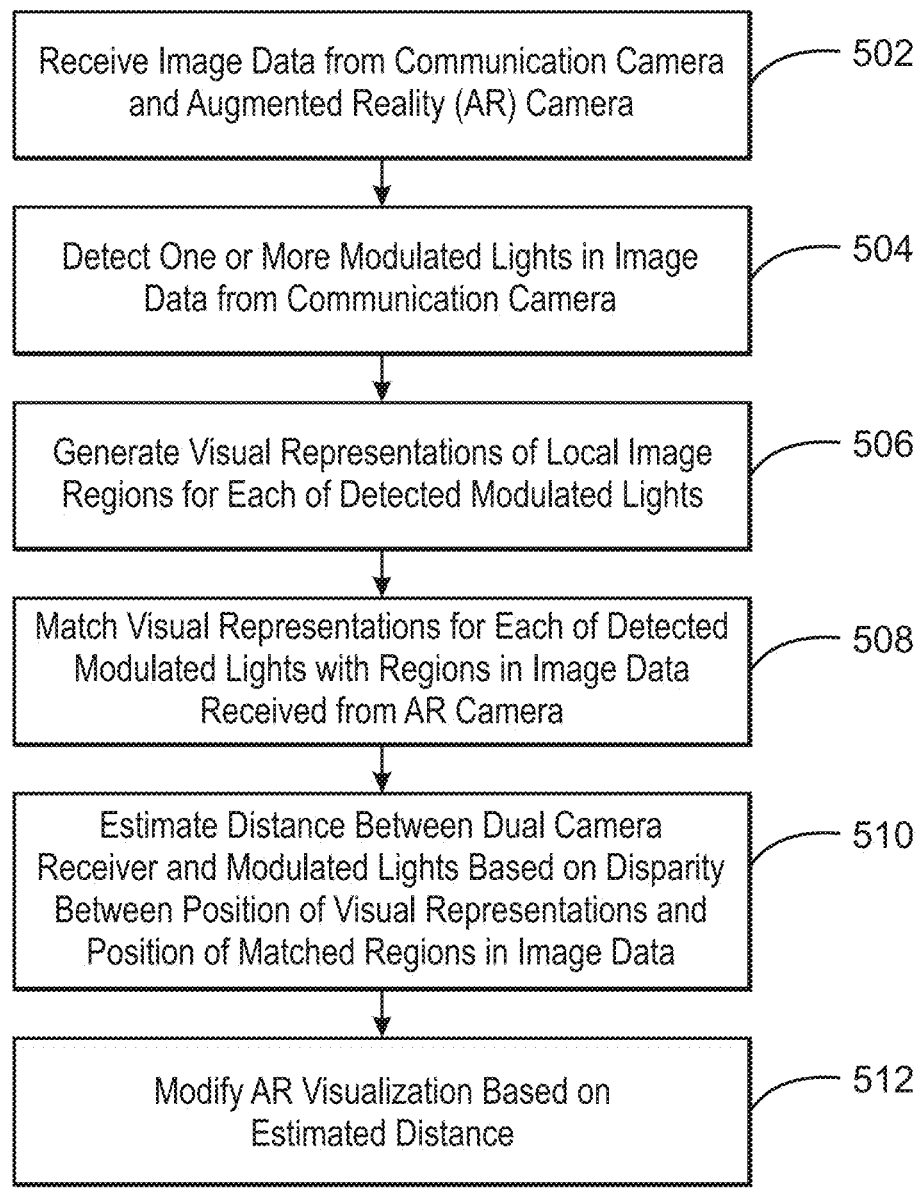
FIG. 5 is a flow chart illustrating a method for detecting depth using a dual camera receiver.

FIG. 5 is a flow chart illustrating a method for detecting depth using a dual camera receiver. The example method is generally referred to by the reference number 500 and can be implemented using the dual camera receiver 108 of the system 100 of FIG. 1 above, the processor 602 of the computing device 600 of FIG. 6 below, or the processor 702 of the computer readable media 700 of FIG. 7 below.

At block 502, a processor receives image data from a communication camera and an augmented reality (AR) camera. For example, the image data may include pixels corresponding to one or more modulated lights on an object.

At block 504, the processor detects one or more modulated lights in the image data from the communication camera. For example, the processor can detect the one or more modulated lights using an under-sampled orthogonal frequency shift on-off keying modulation. In some examples, the processor can detect the one or more modulated lights using a composite waveform modulation.

At block 506, the processor generates one or more visual representations of local image regions for each of the detected modulated lights. For example, the processor can generate a pixel patch of the one or more modulated lights using a local binary pattern. In some examples, the processor can generate a pixel patch of the one or more modulated lights for each of the AR camera and the communication camera. In some examples, the processor can generate pixel patches using a neural network trained to match patches between the AR camera and the communication camera. For example, the neural network may be trained using a training dataset including labeled images containing modulated lights. In some examples, the neural network can generate patch representations internally, compare the patch representations, and output a comparison value. For example, the neural network may assign higher comparison values to closer matching patterns and lower comparison values to the less or non-matching patches such that the values can be used to search the patches along epipolar lines and then detect a matching patch location based on the generated comparison values.

At block 508, the processor matches the visual representations for each of the detected modulated lights with regions in the image data received from the AR camera. In some examples, the processor can search for regions similar to the visual representation across an epipolar line and match the visual representation with a region that is more similar to the visual representation than other regions in the image. For example, the epipolar line may cross a point corresponding to the center of a modulated light in both cameras. If the cameras are calibrated well, a modulated light position in the AR camera should thus be located on the epipolar line as in the other camera. Therefore, the epipolar line can be used as a constraint from one camera to the other to avoid searching across the whole image.

At block 510, the processor estimates a distance between a dual camera receiver and the one or more modulated lights based on a disparity between a position of the visual representations and a position of the matched regions in the image data. In some examples, the dual camera receiver may be arranged in a calibrated stereo setup. For example, the geometry of each camera's lens and sensors and the distance and pose between the two cameras may be known in advance. The processor can calculate a disparity in pixel locations of the modulated lights and estimate the distance based on the disparity, the size of the pixels, and a focal length of the AR camera and the communication camera. For example, the distance can be calculated using Eq. 1 described above. In some examples, the processor can calculate a camera 3D world position for the AR camera and the communication camera. For example, the processor can calculate the 3D world positions of one or more of the cameras using triangulation. In some examples, the processor can calculate the 3D world positions of one or more of the cameras using two points and one or more constraints. For example, the one or more constraints may include known planes of operation, among other suitable constraints.

At block 512, the processor modifies an AR visualization based on the estimated distance. For example, the processor can increase the size of an overlay in the AR visualization based on the estimated distance. In some examples, the processor can include an overlay in the visualization based on the estimated distance. For example, different overlays may be included in the visualization based on the estimated distance and communication information extracted from the modulated lights.

This process flow diagram is not intended to indicate that the blocks of the example process 500 are to be executed in any particular order, or that all of the blocks are to be included in every case. Further, any number of additional blocks not shown may be included within the example process 500, depending on the details of the specific implementation. Moreover, in some examples, detecting the one or more modulated lights and generating the visual representations can be performed in parallel.

Figure 6:
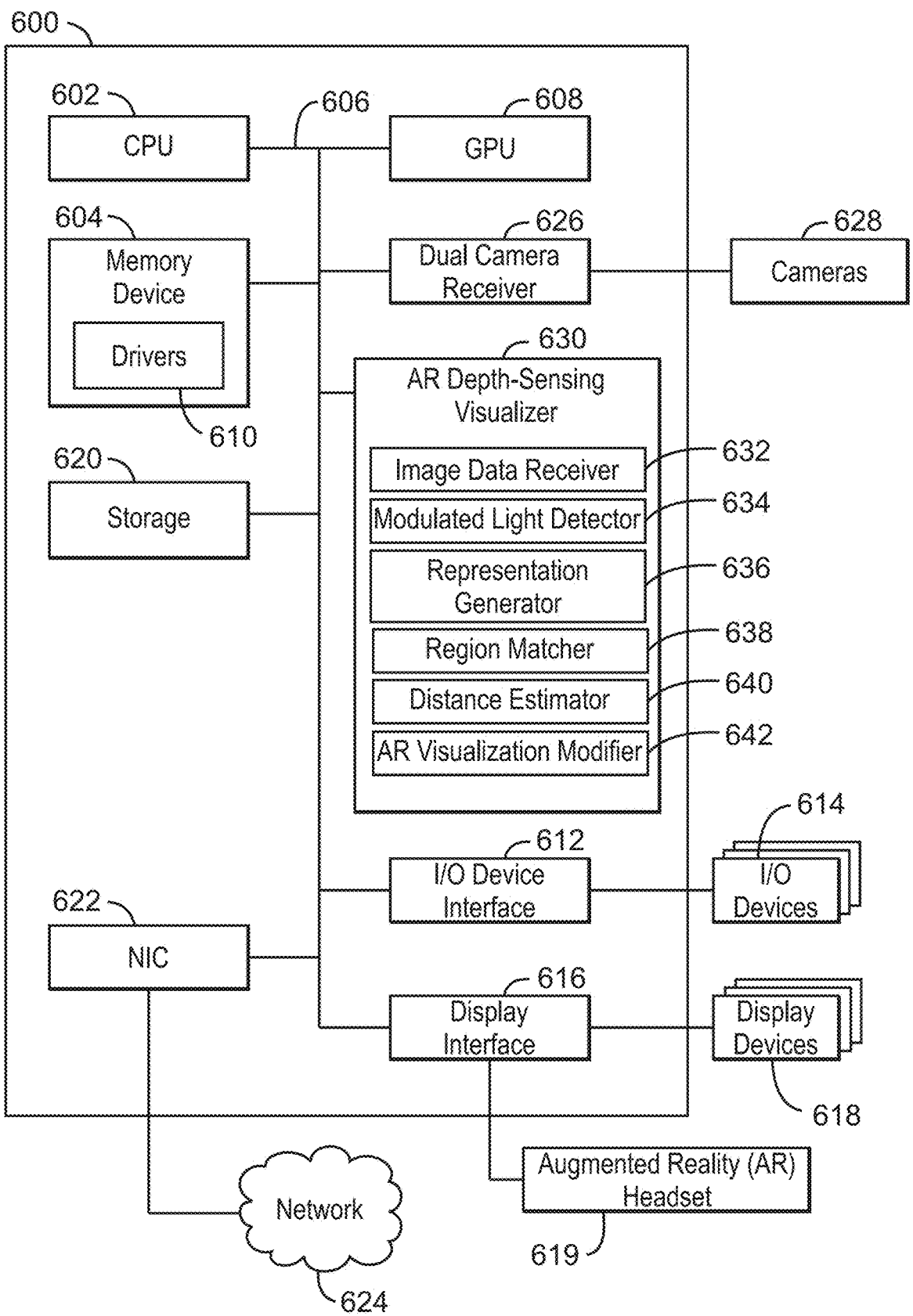
FIG. 6 is block diagram illustrating an example computing device that can detect depth using a dual camera receiver.

Referring now to FIG. 6, a block diagram is shown illustrating an example computing device that can detect depth using a dual camera receiver. The computing device 600 may be, for example, a laptop computer, desktop computer, tablet computer, mobile device, or wearable device, among others. In some examples, the computing device 600 may be an augmented reality (AR) headset system. The computing device 600 may include a central processing unit (CPU) 602 that is configured to execute stored instructions, as well as a memory device 604 that stores instructions that are executable by the CPU 602. The CPU 602 may be coupled to the memory device 604 by a bus 606. Additionally, the CPU 602 can be a single core processor, a multi-core processor, a computing cluster, or any number of other configurations. Furthermore, the computing device 600 may include more than one CPU 602. In some examples, the CPU 602 may be a system-on-chip (SoC) with a multi-core processor architecture. In some examples, the CPU 602 can be a specialized digital signal processor (DSP) used for image processing. The memory device 604 can include random access memory (RAM), read only memory (ROM), flash memory, or any other suitable memory systems. For example, the memory device 604 may include dynamic random access memory (DRAM).

The memory device 604 can include random access memory (RAM), read only memory (ROM), flash memory, or any other suitable memory systems. For example, the memory device 604 may include dynamic random access memory (DRAM).

The computing device 600 may also include a graphics processing unit (GPU) 608. As shown, the CPU 602 may be coupled through the bus 606 to the GPU 608. The GPU 608 may be configured to perform any number of graphics operations within the computing device 600. For example, the GPU 608 may be configured to render or manipulate graphics images, graphics frames, videos, or the like, to be displayed to a user of the computing device 600.

The memory device 604 can include random access memory (RAM), read only memory (ROM), flash memory, or any other suitable memory systems. For example, the memory device 604 may include dynamic random access memory (DRAM). The memory device 604 may include device drivers 610 that are configured to execute the instructions for depth sensing using a dual camera receiver. The device drivers 610 may be software, an application program, application code, or the like.

The CPU 602 may also be connected through the bus 606 to an input/output (I/O) device interface 612 configured to connect the computing device 600 to one or more I/O devices 614. The I/O devices 614 may include, for example, a keyboard and a pointing device, wherein the pointing device may include a touchpad or a touchscreen, among others. The I/O devices 614 may be built-in components of the computing device 600, or may be devices that are externally connected to the computing device 600. In some examples, the memory 604 may be communicatively coupled to I/O devices 614 through direct memory access (DMA).

The CPU 602 may also be linked through the bus 606 to a display interface 616 configured to connect the computing device 600 to a display device 618 and an augmented reality (AR) headset 619. The display device 618 may include a display screen that is a built-in component of the computing device 600. The display device 618 may also include a computer monitor, television, or projector, among others, that is internal to or externally connected to the computing device 600. The AR headset 619 may include one or more displays. In some examples, the AR headset 619 may also include a microphone and one or more speakers.

The computing device 600 also includes a storage device 620. The storage device 620 is a physical memory such as a hard drive, an optical drive, a thumbdrive, an array of drives, a solid-state drive, or any combinations thereof. The storage device 620 may also include remote storage drives.

The computing device 600 may also include a network interface controller (NIC) 622. The NIC 622 may be configured to connect the computing device 600 through the bus 606 to a network 624. The network 624 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 600 further includes a dual camera receiver 626 configured to connect the computing device 600 to two or more cameras 628. For example, the cameras 628 may include an augmented reality camera and a camera communications (CamCom) camera. In some example, the cameras 628 may include a processor to generate depth information including an estimated distance from the dual camera receiver to one or more objects. In some examples, the communication camera and the AR camera can be disposed in a stereo setup position with a predetermined distance between the communication camera and the AR camera. While the present techniques are described as using two cameras, in some examples, any number of cameras may be used.

The computing device 600 further includes an augmented reality (AR) depth-sensing visualizer 630. For example, the AR depth-sensing visualizer 630 can be used to display AR visualizations based on a detected depth of objects. The AR depth-sensing visualizer 630 can include an image data receiver 632, a modulated light detector 634, a representation generator 636, a region matcher 638, a distance estimator 640, and an AR visualization modifier 642. In some examples, each of the components 632-642 of the AR depth-sensing visualizer 630 may be a microcontroller, embedded processor, or software module. The image data receiver 632 can receive image data from a communication camera and an augmented reality (AR) camera. The modulated light detector 634 can detect one or more modulated lights in the image data from the communication camera. For example, the one or more modulated lights may be light emitting diode (LED) tags displaced onto an object. In some examples, the modulated lights can communicate information corresponding to the object to the modulated light detector 634. In some examples, the, the modulated light detector 634 can detect the one or more modulated lights using an under-sampled orthogonal frequency shift on-off keying modulation. In some examples, the modulated light detector 634 can detect the one or more modulated lights using a composite waveform modulation. The representation generator 636 can generate a visual representation of a local image region for each of the detected modulated lights. For example, the visual representation may be a pixel patch generated using a local binary pattern. The region matcher 638 can match the visual representation for each of the detected modulated lights with a region in the image data received from the AR camera. For example, the region matcher 638 can search for regions similar to the visual representation across an epipolar line and match the visual representation with a region that is more similar to the visual representation than other regions in the image. The distance estimator 640 can estimate a distance between a dual camera receiver and the one or more modulated lights based on a disparity between a position of the visual representation and a position of the matched region in the image data. For example, the distance estimator is to further estimate the distance based on the predetermined distance between the communication camera and the AR camera. The AR visualization modifier 642 can modify an AR visualization based on the estimated distance. For example, the AR visualization may include an overlay corresponding to an object including a modulated light, wherein the overlay is to be displayed based on the estimated distance.

The block diagram of FIG. 6 is not intended to indicate that the computing device 600 is to include all of the components shown in FIG. 6. Rather, the computing device 600 can include fewer or additional components not illustrated in FIG. 6, such as additional buffers, additional processors, and the like. The computing device 600 may include any number of additional components not shown in FIG. 6, depending on the details of the specific implementation. Furthermore, any of the functionalities of the image data receiver 632, the modulated light detector 634, the representation generator 636, the region matcher 638, the distance estimator 640, and the AR visualization modifier 642, may be partially, or entirely, implemented in hardware and/or in the processor 602. For example, the functionality may be implemented with an application specific integrated circuit, in logic implemented in the processor 602, or in any other device. In addition, any of the functionalities of the CPU 602 may be partially, or entirely, implemented in hardware and/or in a processor. For example, the functionality of the AR depth-sensing visualizer 630 may be implemented with an application specific integrated circuit, in logic implemented in a processor, in logic implemented in a specialized graphics processing unit such as the GPU 608, or in any other device.

Figure 7:
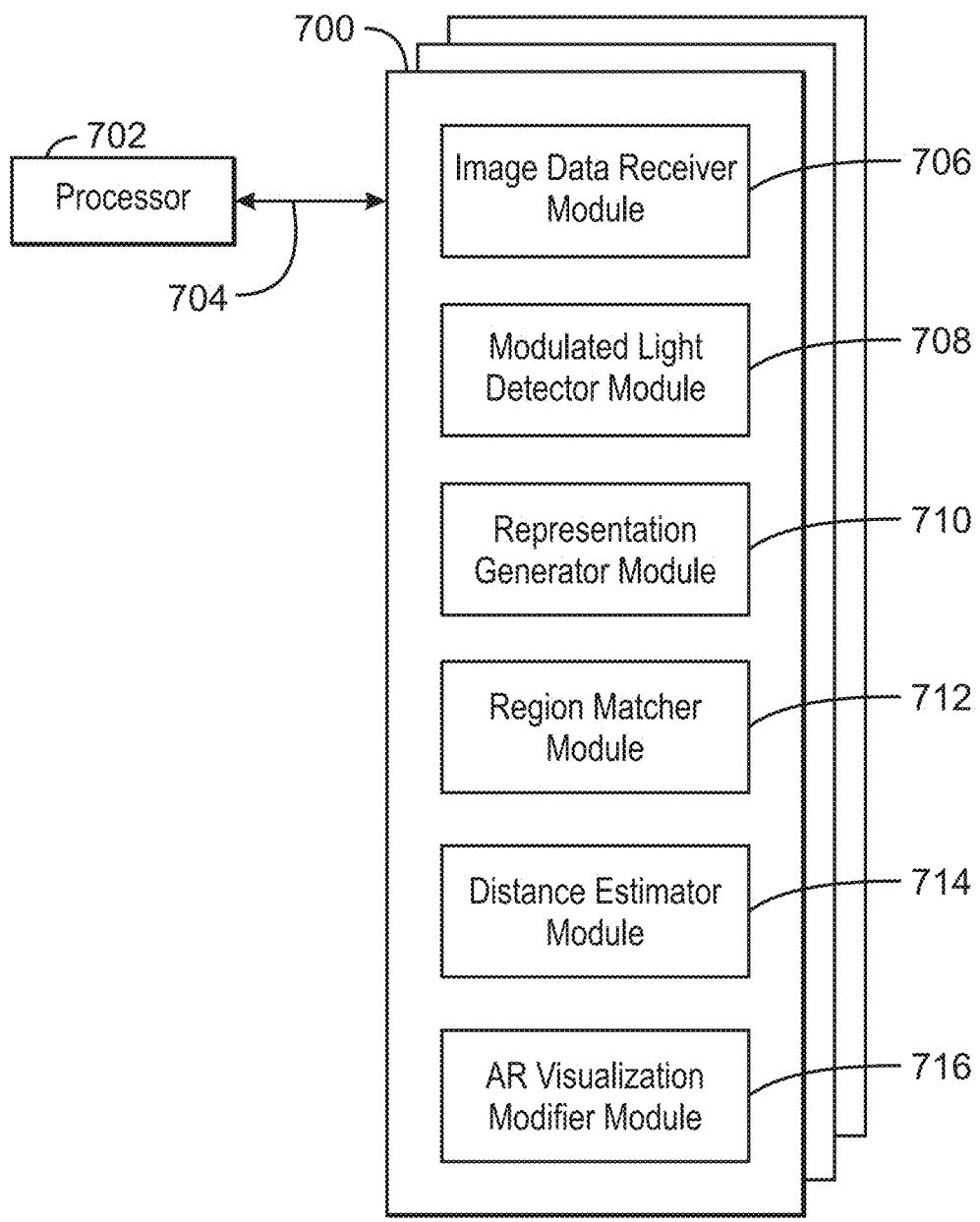
FIG. 7 is a block diagram showing computer readable media that store code for detecting depth using a dual camera receiver.

FIG. 7 is a block diagram showing computer readable media 700 that store code for detecting depth using a dual camera receiver. The computer readable media 700 may be accessed by a processor 702 over a computer bus 704. Furthermore, the computer readable medium 700 may include code configured to direct the processor 702 to perform the methods described herein. In some embodiments, the computer readable media 700 may be non-transitory computer readable media. In some examples, the computer readable media 700 may be storage media.

The various software components discussed herein may be stored on one or more computer readable media 700, as indicated in FIG. 7. For example, an image data receiver module 706 may be configured to receive image data from a communication camera and an augmented reality (AR) camera. A modulated light detector module 708 may be configured to detect one or more modulated lights in the image data from the communication camera. In some examples, the modulated light detector module 708 may be configured to detect the one or more modulated lights using an under-sampled orthogonal frequency shift on-off keying modulation. In some examples, the modulated light detector module 708 may be configured to detect the one or more modulated lights using a composite waveform modulation. A representation generator module 710 may be configured to generate a visual representation of a local image region for each of the detected modulated lights. For example, the representation generator 710 may be configured to generate the visual representation using a local binary pattern. A region matcher module 712 may be configured to match the visual representation for each of the detected modulated lights with a region in the image data received from the AR camera. For example, the region matcher module 712 may be configured to search for regions similar to the visual representation across an epipolar line and match the visual representation with a region that is more similar to the visual representation than other regions in the image. A distance estimator module 714 may be configured to estimate a distance between a dual camera receiver and the one or more modulated lights based on a disparity between a position of the visual representation and a position of the matched region in the image data. For example, the distance estimator module 714 may be configured to calculate a disparity in pixel locations of the modulated lights and estimate the distance based on the disparity, the size of the pixels, and a focal length of the AR camera and the communication camera. In some examples, the AR camera and the communication can be arranged in a calibrated stereo setup. An AR visualization modifier 716 may be configured to modify an AR visualization based on the estimated distance. For example, the AR visualization modifier 716 may be configured to display content in an overlay of the AR visualization based on the estimated distance. In some examples, the AR visualization modifier 716 may be configured to increase the size of an overlay in the AR visualization based on the estimated distance.

The block diagram of FIG. 7 is not intended to indicate that the computer readable media 700 is to include all of the components shown in FIG. 7. Further, the computer readable media 700 may include any number of additional components not shown in FIG. 7, depending on the details of the specific implementation.

EXAMPLES

Example 1 is an apparatus for depth sensing. The apparatus includes an image data receiver to receive image data from a communication camera and an augmented reality (AR) camera. The apparatus also includes a modulated light detector to detect one or more modulated lights in the image data from the communication camera. The apparatus further includes a representation generator to generate a visual representation of a local image region for each of the detected modulated lights. The apparatus also further includes a region matcher to match the visual representation for each of the detected modulated lights with a region in the image data received from the AR camera. The apparatus also includes a distance estimator to estimate a distance between a dual camera receiver and the one or more modulated lights based on a disparity between a position of the visual representation and a position of the matched region in the image data.

Example 2 includes the apparatus of example 1, including or excluding optional features. In this example, the apparatus includes an augmented reality (AR) visualization modifier to modify an AR visualization based on the estimated distance.

Example 3 includes the apparatus of any one of examples 1 to 2, including or excluding optional features. In this example, the AR visualization includes an overlay corresponding to an object including a modulated light, wherein the overlay is to be displayed based on the estimated distance.

Example 4 includes the apparatus of any one of examples 1 to 3, including or excluding optional features. In this example, the apparatus includes an augmented reality (AR) headset to display the AR visualization.

Example 5 includes the apparatus of any one of examples 1 to 4, including or excluding optional features. In this example, the visual representation includes a pixel patch generated using a local binary pattern.

Example 6 includes the apparatus of any one of examples 1 to 5, including or excluding optional features. In this example, the modulated lights include light emitting diode (LED) tags displaced onto an object.

Example 7 includes the apparatus of any one of examples 1 to 6, including or excluding optional features. In this example, the modulated lights are to communicate information corresponding to the object to the modulated light detector.

Example 8 includes the apparatus of any one of examples 1 to 7, including or excluding optional features. In this example, the communication camera and the AR camera are disposed in a stereo setup position with a predetermined distance between the communication camera and the AR camera, wherein the distance estimator is to further estimate the distance based on the predetermined distance between the communication camera and the AR camera.

Example 9 includes the apparatus of any one of examples 1 to 8, including or excluding optional features. In this example, the modulated light detector is to detect the one or more modulated lights using an under-sampled orthogonal frequency shift on-off keying modulation.

Example 10 includes the apparatus of any one of examples 1 to 9, including or excluding optional features. In this example, the modulated light detector is to detect the one or more modulated lights using a composite waveform modulation.

Example 11 is a method for depth sensing. The method includes receiving, via a processor, image data from a communication camera and an augmented reality (AR) camera. The method also includes detecting, via the processor, one or more modulated lights in the image data from the communication camera. The method further includes generating, via the processor, a visual representation of a local image region for each of the detected modulated lights. The method also further includes matching, via the processor, the visual representation for each of the detected modulated lights with a region in the image data received from the AR camera. The method also includes estimating, via the processor, a distance between a dual camera receiver and the one or more modulated lights. The method also further includes modifying, via the processor, an augmented reality (AR) visualization based on the estimated distance.

Example 12 includes the method of example 11, including or excluding optional features. In this example, generating the visual representation includes generating a pixel patch of the one or more modulated lights using a local binary pattern.

Example 13 includes the method of any one of examples 11 to 12, including or excluding optional features. In this example, estimating the distance includes calculating a disparity in pixel locations of the modulated lights and estimating the distance based on the disparity, the size of the pixels, and a focal length of the AR camera and the communication camera.

Example 14 includes the method of any one of examples 11 to 13, including or excluding optional features. In this example, modifying the AR visualization includes increasing the size of an overlay in the AR visualization based on the estimated distance.

Example 15 includes the method of any one of examples 11 to 14, including or excluding optional features. In this example, modifying the AR visualization includes including an overlay in the visualization based on the estimated distance.

Example 16 includes the method of any one of examples 11 to 15, including or excluding optional features. In this example, estimating the distance includes calculating a three-dimensional world position of the AR camera or the communication camera using triangulation.

Example 17 includes the method of any one of examples 11 to 16, including or excluding optional features. In this example, estimating the distance includes calculating a three-dimensional world position of the AR camera or the communication camera based on two points and one or more constraints.

Example 18 includes the method of any one of examples 11 to 17, including or excluding optional features. In this example, generating the visual representation includes generating a pixel patch of the one or more modulated lights for each of the AR camera and the communication camera.

Example 19 includes the method of any one of examples 11 to 18, including or excluding optional features. In this example, generating the visual representation includes generating pixel patches using a neural network trained to match patches between the AR camera and the communication camera.

Example 20 includes the method of any one of examples 11 to 19, including or excluding optional features. In this example, detecting the one or more modulated lights and generating a visual representation is performed in parallel.

Example 21 is at least one computer readable medium for depth sensing having instructions stored therein that direct the processor to receive image data from a communication camera and an augmented reality (AR) camera. The computer-readable medium also includes instructions that direct the processor to detect one or more modulated lights in the image data from the communication camera; generate a visual representation of a local image region for each of the detected modulated lights. The computer-readable medium also further includes instructions that direct the processor to match the visual representation for each of the detected modulated lights with a region in the image data received from the AR camera. The computer-readable medium also includes instructions that direct the processor to estimate a distance between a dual camera receiver and the one or more modulated lights. The computer-readable medium also further includes instructions that direct the processor to modify an augmented reality (AR) visualization based on the estimated distance.

Example 22 includes the computer-readable medium of example 21, including or excluding optional features. In this example, the computer-readable medium includes instructions to calculate a disparity in pixel locations of the modulated lights and estimate the distance based on the disparity, the size of the pixels, and a focal length of the AR camera and the communication camera.

Example 23 includes the computer-readable medium of any one of examples 21 to 22, including or excluding optional features. In this example, the computer-readable medium includes instructions to generate the visual representation using a local binary pattern.

Example 24 includes the computer-readable medium of any one of examples 21 to 23, including or excluding optional features. In this example, the computer-readable medium includes instructions to display content in an overlay of the AR visualization based on the estimated distance.

Example 25 includes the computer-readable medium of any one of examples 21 to 24, including or excluding optional features. In this example, the computer-readable medium includes instructions to increase the size of an overlay in the AR visualization based on the estimated distance.

Example 26 includes the computer-readable medium of any one of examples 21 to 25, including or excluding optional features. In this example, the computer-readable medium includes instructions to calculate a three-dimensional world position of the AR camera or the communication camera using triangulation.

Example 27 includes the computer-readable medium of any one of examples 21 to 26, including or excluding optional features. In this example, the computer-readable medium includes instructions to calculate a three-dimensional world position of the AR camera or the communication camera based on two points and one or more constraints.

Example 28 includes the computer-readable medium of any one of examples 21 to 27, including or excluding optional features. In this example, the computer-readable medium includes instructions to generate a pixel patch of the one or more modulated lights for each of the AR camera and the communication camera.

Example 29 includes the computer-readable medium of any one of examples 21 to 28, including or excluding optional features. In this example, the computer-readable medium includes instructions to generate pixel patches using a neural network trained to match patches between the AR camera and the communication camera.

Example 30 includes the computer-readable medium of any one of examples 21 to 29, including or excluding optional features. In this example, the computer-readable medium includes instructions to perform detection the one or more modulated lights and generate a visual representation in parallel.

Example 31 is a system for depth sensing. The system includes an image data receiver to receive image data from a communication camera and an augmented reality (AR) camera. The system also includes a modulated light detector to detect one or more modulated lights in the image data from the communication camera. The system also further includes a representation generator to generate a visual representation of a local image region for each of the detected modulated lights. The system also includes a region matcher to match the visual representation for each of the detected modulated lights with a region in the image data received from the AR camera. The system further includes a distance estimator to estimate a distance between a dual camera receiver and the one or more modulated lights based on a disparity between a position of the visual representation and a position of the matched region in the image data.

Example 32 includes the system of example 31, including or excluding optional features. In this example, the system includes an augmented reality (AR) visualization modifier to modify an AR visualization based on the estimated distance.

Example 33 includes the system of any one of examples 31 to 32, including or excluding optional features. In this example, the AR visualization includes an overlay corresponding to an object including a modulated light, wherein the overlay is to be displayed based on the estimated distance.

Example 34 includes the system of any one of examples 31 to 33, including or excluding optional features. In this example, the system includes an augmented reality (AR) headset to display the AR visualization.

Example 35 includes the system of any one of examples 31 to 34, including or excluding optional features. In this example, the visual representation includes a pixel patch generated using a local binary pattern.

Example 36 includes the system of any one of examples 31 to 35, including or excluding optional features. In this example, the modulated lights include light emitting diode (LED) tags displaced onto an object.

Example 37 includes the system of any one of examples 31 to 36, including or excluding optional features. In this example, the modulated lights are to communicate information corresponding to the object to the modulated light detector.

Example 38 includes the system of any one of examples 31 to 37, including or excluding optional features. In this example, the communication camera and the AR camera are disposed in a stereo setup position with a predetermined distance between the communication camera and the AR camera, wherein the distance estimator is to further estimate the distance based on the predetermined distance between the communication camera and the AR camera.

Example 39 includes the system of any one of examples 31 to 38, including or excluding optional features. In this example, the modulated light detector is to detect the one or more modulated lights using an under-sampled orthogonal frequency shift on-off keying modulation.

Example 40 includes the system of any one of examples 31 to 39, including or excluding optional features. In this example, the modulated light detector is to detect the one or more modulated lights using a composite waveform modulation.

Example 41 is a system for depth sensing. The system includes means for receiving image data from a communication camera and an augmented reality (AR) camera. The system also includes means for detecting one or more modulated lights in the image data from the communication camera. The system also further includes means for generating a visual representation of a local image region for each of the detected modulated lights. The system also includes means for matching the visual representation for each of the detected modulated lights with a region in the image data received from the AR camera. The system also further includes means for estimating a distance between a dual camera receiver and the one or more modulated lights based on a disparity between a position of the visual representation and a position of the matched region in the image data.

Example 42 includes the system of example 41, including or excluding optional features. In this example, the system includes means for modifying an AR visualization based on the estimated distance.

Example 43 includes the system of any one of examples 41 to 42, including or excluding optional features. In this example, the AR visualization includes an overlay corresponding to an object including a modulated light, wherein the overlay is to be displayed based on the estimated distance.

Example 44 includes the system of any one of examples 41 to 43, including or excluding optional features. In this example, the system includes means for displaying the AR visualization.

Example 45 includes the system of any one of examples 41 to 44, including or excluding optional features. In this example, the visual representation includes a pixel patch generated using a local binary pattern.

Example 46 includes the system of any one of examples 41 to 45, including or excluding optional features. In this example, the modulated lights include light emitting diode (LED) tags displaced onto an object.

Example 47 includes the system of any one of examples 41 to 46, including or excluding optional features. In this example, the modulated lights are to communicate information corresponding to the object to the modulated light detector.

Example 48 includes the system of any one of examples 41 to 47, including or excluding optional features. In this example, the communication camera and the AR camera are disposed in a stereo setup position with a predetermined distance between the communication camera and the AR camera, wherein the distance estimator is to further estimate the distance based on the predetermined distance between the communication camera and the AR camera.

Example 49 includes the system of any one of examples 41 to 48, including or excluding optional features. In this example, the means for detecting the one or more modulated lights is to detect the one or more modulated lights using an under-sampled orthogonal frequency shift on-off keying modulation.

Example 50 includes the system of any one of examples 41 to 49, including or excluding optional features. In this example, the means for detecting the one or more modulated lights is to detect the one or more modulated lights using a composite waveform modulation.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system for depth sensing, comprising a processor to:
   receive image data from a communication camera and an augmented reality (AR) camera;
   detect one or more modulated lights in the image data from the communication camera using a composite waveform modulation;
   generate a visual representation of a local image region for each of the detected modulated lights;
   match the visual representation for each of the detected modulated lights with a region in the image data received from the AR camera; and
   estimate a distance between a dual camera receiver and the one or more modulated lights based on a disparity between a position of the visual representation and a position of the matched region in the image data.

2. The system of claim 1, wherein the processor is to modify an AR visualization based on the estimated distance.

3. The system of claim 2, wherein the AR visualization comprises an overlay corresponding to an object comprising a modulated light, wherein the overlay is to be displayed based on the estimated distance.

4. The system of claim 3, comprising an augmented reality (AR) headset to display the AR visualization.

5. The system of claim 1, wherein the visual representation comprises a pixel patch generated using a local binary pattern.

6. The system of claim 1, wherein the modulated lights comprise light emitting diode (LED) tags displaced onto an object.

7. The system of claim 6, wherein the modulated lights are to communicate information corresponding to the object.

8. The system of claim 1, wherein the communication camera and the AR camera are disposed in a stereo setup position with a predetermined distance between the communication camera and the AR camera, wherein the processor is to further estimate the distance based on the predetermined distance between the communication camera and the AR camera.

9. The system of claim 1, wherein the processor is to detect the one or more modulated lights using an under-sampled orthogonal frequency shift on-off keying modulation.

10. A method for depth sensing, comprising:
    receiving, via a processor, image data from a communication camera and an augmented reality (AR) camera;

detecting, via the processor, one or more modulated lights in the image data from the communication camera;

generating, via the processor, a visual representation of a local image region for each of the detected modulated lights, wherein generating the visual representation comprises generating a pixel patch of the one or more modulated lights using a local binary pattern;

matching, via the processor, the visual representation for each of the detected modulated lights with a region in the image data received from the AR camera;

estimating, via the processor, a distance between a dual camera receiver and the one or more modulated lights; and modifying, via the processor, an augmented reality (AR) visualization based on the estimated distance.

11. The method of claim 10, wherein estimating the distance comprises calculating a disparity in pixel locations of the modulated lights and estimating the distance based on the disparity, a size of pixels, and a focal length of the AR camera and the communication camera.

12. The method of claim 10, wherein modifying the AR visualization comprises increasing a size of an overlay in the AR visualization based on the estimated distance.

13. The method of claim 10, wherein modifying the AR visualization comprises including an overlay in the visualization based on the estimated distance.

14. The method of claim 10, wherein estimating the distance comprises calculating a three-dimensional world position of the AR camera or the communication camera using triangulation.

15. The method of claim 10, wherein estimating the distance comprises calculating a three-dimensional world position of the AR camera or the communication camera based on two points and one or more constraints.

16. The method of claim 10, wherein generating the visual representation comprises generating the pixel patch of the one or more modulated lights for each of the AR camera and the communication camera.

17. The method of claim 10, wherein generating the visual representation comprises generating pixel patches using a neural network trained to match patches between the AR camera and the communication camera based on generated comparison values.

18. The method of claim 10, wherein detecting the one or more modulated lights and generating the visual representation is performed in parallel.

19. At least one non-transitory computer readable medium for depth sensing having instructions stored therein that, in response to being executed on a computing device, cause the computing device to:

receive image data from a communication camera and an augmented reality (AR) camera;

detect one or more modulated lights in the image data from the communication camera;

generate a visual representation of a local image region using a local binary pattern for each of the detected modulated lights;

match the visual representation for each of the detected modulated lights with a region in the image data received from the AR camera;

estimate a distance between a dual camera receiver and the one or more modulated lights; and modify an augmented reality (AR) visualization based on the estimated distance.

20. The at least one non-transitory computer readable medium of claim 19, comprising instructions to calculate a disparity in pixel locations of the modulated lights and estimate the distance based on the disparity, a size of pixels, and a focal length of the AR camera and the communication camera.

21. The at least one non-transitory computer readable medium of claim 19, comprising instructions to display content in an overlay of the AR visualization based on the estimated distance.

22. The at least one non-transitory computer readable medium of claim 19, comprising instructions to increase a size of an overlay in the AR visualization based on the estimated distance.

* * * * *